United States Patent [19]
Hallengren

[11] 3,901,812
[45] Aug. 26, 1975

[54] VISIBILITY METER USING MULTIPLE LIGHT BEAMS

[75] Inventor: Hans Lennart Hallengren, Lidingo, Sweden

[73] Assignee: Satt Elektronik AB, Stockholm, Sweden

[22] Filed: Jan. 17, 1974

[21] Appl. No.: 434,099

[30] Foreign Application Priority Data
Jan. 18, 1973 Sweden............................. 7300716

[52] U.S. Cl. ................ 250/565; 250/205; 250/575; 356/104
[51] Int. Cl. ......................................... G01n 21/26
[58] Field of Search ........... 250/205, 573, 574, 575, 250/564, 565, 220 R; 356/103, 104, 207, 208

[56] References Cited
UNITED STATES PATENTS

| | | | |
|---|---|---|---|
| 3,582,661 | 6/1971 | Pijls.................................... | 250/205 |
| 3,629,589 | 12/1971 | Gleixner......................... | 250/564 X |
| 3,664,752 | 5/1972 | Hermieu......................... | 356/208 X |
| 3,760,395 | 9/1973 | Muller........................... | 250/564 X |

*Primary Examiner*—Walter Stolwein
*Attorney, Agent, or Firm*—Waters, Schwartz & Nissen

[57] ABSTRACT

A visibility meter comprising a first light source for transmitting modulated light radiation into an atmosphere in the form of a main beam of light, and a second light source for generating a radiation intensity reference beam. A first light radiation sensing device receives both the reference beam and reflected radiation constituting part of the radiation transmitted into the atmosphere by the main beam after reflection of such part in the atmosphere. A discriminator is connected to the first radiation sensing device for comparing the intensity of radiation received by the sensing device after reflection in the atmosphere and the intensity of the reference beam. A control unit is connected to the discriminator to change the intensity of radiation of at least one of the first and second light sources in dependence of the variation of the ratio of the intensity of the reflected radiation and the intensity of the reference beam from a predetermined ratio value to restore the ratio to the predetermined value. A second light sensing device determines the intensity of radiation emitted by the first light source and a third light radiation sensing device determines the intensity of radiation emitted by the second light source. An output device is connected to the second and third radiation sensing devices for indicating visibility in dependence of the ratio of the measured radiation intensities of the first and second light sources.

2 Claims, 1 Drawing Figure

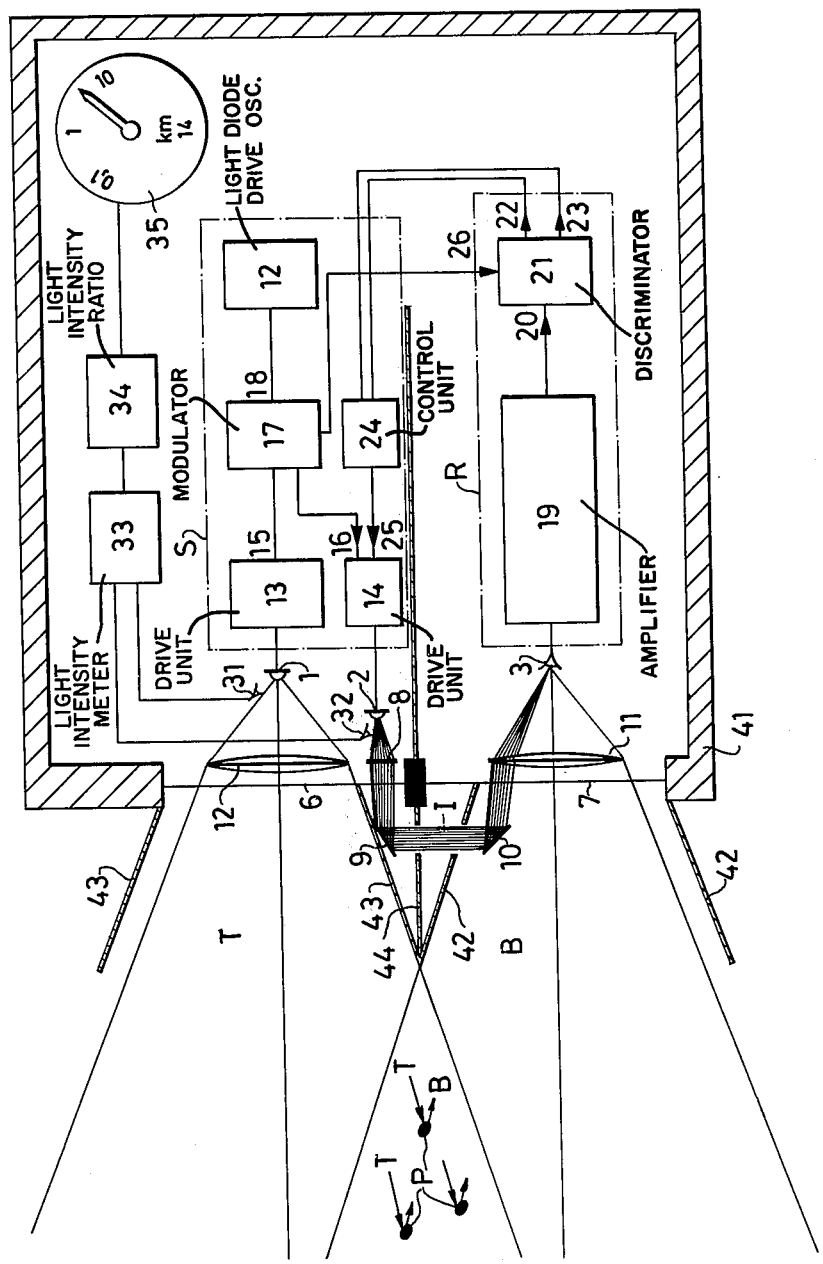

VISIBILITY METER USING MULTIPLE LIGHT BEAMS

The present invention relates generally to visibility meters such as are commonly utilized to measure transmission of radiation and reflectance in the visible wavelength range of the spectrum. Like most measuring devices, visibility meters may be constructed so as to present, within a selected range of measurement, an indication of a measured quantity, or to present an indication of a particular selected threshold value of the measured quantity. Visibility meters which are utilized to decide whether the visibility through air is above or below a predetermined value at which one or other measure is to be taken, to satisfy sea or air traffic demands, for instance, are usually called "mist detectors."

With specific advantage the present invention is adaptable to visibility meters of the kind presenting, within a selected measuring range, an indication of the measured quantity visibility, although the invention is as well advantageously to be utilized for fog detectors of the kind providing for, for instance, an automatic switching on or off of fog signalling means or the like for navigational purposes at a selected value of visibility.

Visibility meters are described in which variation of visible light from a local light source is used for the measurement, the intensity of light reflected from the surrounding air toward a photo cell being measured, a modulated light radiation being used to eliminate the influence on the measuring device of irrelevant radiation.

A presently known fog detector of this kind, presenting a satisfactory measuring result for a number of purposes and equipped with a transmitter for radiating a modulated light beam into a range supervised by the fog detector in form of a main light beam, and a receiver to receive part of the radiation originating from the transmitter after a reflection in the surrounding atmosphere, comprises means to provide an intensity reference signal transferred directly from the transmitter to the receiver and having a predetermined magnitude relative to the radiation intensity of the transmitter, said intensity reference signal further being modulated in antiphase to said main beam and therewith as well in antiphase to the radiation originating from the transmitter and received by the receiver after reflection in said range.

The presence of fog is determined by means of a comparison between the intensity reference signal and a signal, the meterage signal, caused by reflected radiation, the comparison being effected by means of a discriminator, the output signal of which is representative of the magnitude and the sign of the difference between the intensity reference signal and the meterage signal. In a form suitable for determining a visibility threshold value the instrument is constructed so as to provide an output signal usable for indication or control when the meterage signal changes from values below to values above a selected level of the intensity reference signal, or vice versa.

To improve the reliability of a visibility meter based on the same principles as the fog detector just described, it has been proposed (Swedish Pat. specification No. 350,838) to generate the light of the main-beam and the light used for generating the intensity reference signal by means of two separate light sources in the form of light diodes. In this known device, the two light sources are driven so as to provide light pulse trains, the pulses of which are mutually out of phase and the common frequency of which is determined by a drive oscillator.

The main object of this present invention is to provide an improvement of a device as last described. In particular, unreliability of said device originating from stability conditions of the light diodes therein has been eliminated to a substantial extent. Further, the invention makes possible, in a simple manner and within a selected magnitude range of visibility, indication of relative magnitude of visibility in a convenient unit scale. Such indication of visibility magnitude is, as a matter of principle, providable for in a fog detector of the kind described above, such as, for instance, by means of adjusting the position of a grey wedge in the path of the reference beam, the means required for the device to present adequate readings to the observer of magnitude of a measured visibility being comparatively complicated.

According to the present invention, the object of which is to provide an improved visibility meter, be it a visibility magnitude indicating instrument or a visibility threshold value indicating fog detector, the visibility meter has characteristics appearing from the appending claims.

Other features of the invention will appear from the following description given in conjunction with the sole FIGURE of the accompanying drawing, diagrammatically and by way of example showing an embodiment of the invention.

The electronic circuit elements constituting part of the visibility meter are presented in block form as comprising means which are, as such, well known, and which are easily constructed by one skilled in the art, guided by the function mentioned in the description.

The visibility meter illustrated in the drawing comprises two separate light sources, each constituted by a light diode of which one, the light diode 1, is arranged so as to radiate a light beam, constituting the main beam T of the meter, into the atmosphere surrounding the visibility meter, and the visibility of which is to be measured, and the second one, the light diode 2, to radiate a light beam, the intensity reference beam I, toward a light sensor, photo diode 3, which generates an input signal to the receiver part R, described in greater detail below, of the visibility meter and arranged so as to receive as well radiation B originating from the main beam and, in the presence of fog particles in the range irradiated by the main beam, reflected toward the light sensor 3.

In the embodiment illustrated in the drawing, the light rays originating from the light diode 2 pass to the photo diode 3 through protecting glasses, as such necessary equipment parts of a device of this kind and as illustrated constituted by a window 6 for outwardly directed radiation and a window 7 for received radiation, a contamination of the protecting windows thereby automatically obtaining substantially similar influence on the main beam and on the reference beam. The light originating from light diode 2 passes via an optical system 8, window 6 and mirrors or prisms 9 and 10 through window 7 and an optical system 11 to the photo diode 3.

The main beam T passes via an optical system 12 into the surrounding atmosphere in which particles P, when present, cause reflected light B, which originates from the main beam and which, after having passed the window 7 and the optical system 11, is received by the photo diode 3.

The two light diodes 1 and 2 are driven in anti-phase, or in any case out of phase mutually, with a selected frequency determined by a drive oscillator 12 constituting part of the transmitter portion S of the visibility meter and selected in accordance with common practice in the visibility meter and fog detector field to avoid interference of irrelevant light and other interference sources.

The light diodes 1 and 2 are fed by means of drive units 13 and 14, respectively, having control input terminals 15 and 16, respectively, each connected to output terminals of a modulator 17, feeding the two drive units in mutual anti-phase. As illustrated, an input terminal 18 of modulator 17 is connected to the output terminal of the drive oscillator 12 mentioned above.

In the embodiment illustrated in the drawing, the signal generated by proto diode 3 and originating in part from the intensity reference beam I of the light diode 2, in part from radiation B, if present, originating from main-beam T and reflected from fog particles present in the atmosphere, is amplified by an amplifier 19 and applied to input terminals 20 of a discriminator 21. In a manner well known per se, discriminator 21 is of the kind generating output signals via output terminals 22, 23, said output signals being individually related to phase positions of oscillations originating from the respective light sources in the signal applied to the input terminals of amplifier 19.

Due to the fact that the phase position of the oscillation transferred from amplifier 19 to discriminator 21 is related to the amplitude relation between the radiations B and I received by photo diode 3, the character of the output signal of the discriminator 21 will be dependent on the fact whether the radiation B from the surrounding atmosphere, as received by photo diode 3, has a higher or lower intensity than or the same intensity as the intensity reference beam I.

In the embodiment illustrated in the drawing, the output signal of discriminator 21 is utilized for actuating a control means 24, which, via an intensity control input terminal 25 of drive unit 14 of light diode 2 sets the radiation intensity of light diode 2 to such level that a predetermined relation between radiation B and radiation I at photo diode 3, equality, for instance, is present, control means 24 thus setting the radiation of photo diode 2 to a corresponding level in dependence of the output signal of discriminator 21.

When visibility changes, in consequence whereof radiation B received by photo diode 3 changes as well, a corresponding change of intensity of light diode 2 is provided for in dependence of the magnitude of radiation B in the control loop constituted by photo diode 3, amplifier 19, discriminator 21, control unit 24, drive unit 14, light diode 2 and light radiation I.

Thus, in this loop control unit 24 constitutes a discriminator controlled servo unit, which in practice may be constituted by electronic means in the form of an amplifier providing an intensity control signal to drive unit 14, which is, as mentioned above, controlled by modulator 17 to provide drive pulses for the light diode 2, or, obviously, a mechanical servo unit actuating means to provide a corresponding intensity control signal.

A reference frequency signal, required as usual for discriminator 21 to discriminate between the two signals together constituting the input signal to the discriminator, is applied to input terminals 26 of discriminator 21 from output terminals of modulator 17.

With a device thus described, the intensity of the radiation of light diode 2, and therewith the intensity of beam I, is automatically set to a level which is dependent of the intensity of radiation T of light diode I and of a factor, the size of which corresponds to how large a part of radiation T which, after a reflection in the atmosphere, is reflected to and received by photo diode 3, said factor in turn being a representative measure of visibility.

Consequently, a quantity representative of visibility is obtainable as the ratio of intensities of light diodes 1 and 2 when the control loop mentioned above is in balance, which, in practice and with respect to the fact that changes of visibility proceed comparatively slow, implies that a representative quantity of visibility is obtainable as the ratio between the intensities of light diodes 1 and 2, presuming a satisfactory choice of time constants of the respective circuits in accordance with principles well known to one skilled in the art.

To establish an indication of said ratio between the intensities of light diodes 1 and 2, said ratio thus being a measure of visibility, the embodiment illustrated in the drawing comprises for each one of the light 1, 2 a photo diode 31, 32, respectively, to measure the intensity of the respective light diodes and the output signals of which is applied to a balance circuit 33 measuring the respective intensities, the values of which are applied to a ratio establishing circuit 34 to provide a signal proportional to the ratio of the magnitudes of signals received from balance unit 33 and being analogous with the intensities of the main beam and the reference beam, respectively. The output signal of ratio calculating unit 34 is measured by means of a measuring instrument 35 providing an output voltage analogous to the measured ratio and, consequently, providing a reading representative of visibility. Therefore, instrument 35 may be provided with readings of meteorological visibility.

While this invention has been described with respect to specific examples thereof, it should not be construed as being limited thereto. Various modifications and substitutions will be obvious to those skilled in the art and can be made without departing from the scope of this invention.

What is claimed is:

1. A visibility meter comprising: a first light source for transmitting modulated light radiation into an atmosphere in the form of a main beam of light, a second light source for generating a radiation intensity reference beam, a first light radiation sensing means for receiving said reference beam and for receiving reflected radiation constituting part of the radiation transmitted into said atmosphere by means of said main beam after reflection of such part in said atmosphere, comparison means connected to said first radiation sensing means for comparing the intensity of said main beam radiation received by said sensing means after reflection in said atmosphere and the intensity of said reference beam, control means for changing the intensity of radiation of at least one of said first and said second light sources in dependence of the variation of the ratio of the intensity of said main beam reflected radiation and the intensity of said reference beam from a predetermined ratio value to restore said ratio to said predetermined value, second light radiation sensing means for determining the intensity of radiation emitted by said first light source, third light radiation sensing means for determining the intensity of radiation emitted by said second light source and means connected to said second and third radiation sensing means for indicating visibility in dependence of the ratio of said measured radiation intensities of said first and said second light sources.

2. A visibility meter as claimed in claim 1 wherein the light source whose intensity is charged as a function of the variation of the ratio of the intensity of the main beam reflected radiation and the intensity of the reference beam is the said second light source.

* * * * *